(12) United States Patent
Duchesne et al.

(10) Patent No.: US 8,273,397 B2
(45) Date of Patent: Sep. 25, 2012

(54) METHOD OF IMPROVING THE EFFICIENCY OF FAT SEPARATION IN THE SEPARATION OF A LIQUID FOOD PRODUCT

(75) Inventors: Marius Duchesne, Brossard (CA); Rolf Månsson, Veberöd (SE)

(73) Assignee: Tetra Laval Holdings & Finance SA, Pully (CH)

( * ) Notice: Subject to any disclaimer, the term of this patent is extended or adjusted under 35 U.S.C. 154(b) by 857 days.

(21) Appl. No.: 10/592,756

(22) PCT Filed: Mar. 14, 2005

(86) PCT No.: PCT/SE2005/000361
§ 371 (c)(1),
(2), (4) Date: May 30, 2008

(87) PCT Pub. No.: WO2005/086994
PCT Pub. Date: Sep. 22, 2005

(65) Prior Publication Data
US 2008/0279999 A1 Nov. 13, 2008

(30) Foreign Application Priority Data
Mar. 15, 2004 (SE) ........................................ 0400634

(51) Int. Cl.
*A23C 13/00* (2006.01)
(52) U.S. Cl. .................... 426/491; 426/580; 426/586
(58) Field of Classification Search .................. 426/491, 426/580
See application file for complete search history.

(56) References Cited

U.S. PATENT DOCUMENTS

| | | | | |
|---|---|---|---|---|
| 1,683,728 A * | 9/1928 | Rushton | ..................... | 426/330.2 |
| 2,264,665 A * | 12/1941 | Hall | .............................. | 426/417 |
| 2,325,871 A * | 8/1943 | Muerle | .......................... | 494/57 |
| 2,567,898 A * | 9/1951 | Staaff | ............................. | 426/231 |
| 2,603,568 A * | 7/1952 | Nelson | .......................... | 426/388 |
| 2,673,155 A * | 3/1954 | Turnbow | ....................... | 426/580 |
| 2,726,808 A * | 12/1955 | Fitzsimmons | .................... | 494/2 |
| 3,829,584 A * | 8/1974 | Seiberling | ..................... | 426/231 |
| 3,946,113 A * | 3/1976 | Seiberling | ..................... | 426/231 |
| 4,017,643 A * | 4/1977 | Lester | ........................... | 426/231 |
| 4,144,804 A * | 3/1979 | O'Keefe et al. | ................. | 99/452 |
| 5,017,396 A * | 5/1991 | Lehmann et al. | ............ | 426/491 |
| 5,591,469 A | 1/1997 | Zettier | | |
| 5,928,702 A * | 7/1999 | Lidman et al. | ................ | 426/580 |
| 6,228,409 B1 * | 5/2001 | Axelsson | ....................... | 426/397 |
| 6,468,574 B1 * | 10/2002 | Zettier | .......................... | 426/491 |
| 7,837,608 B2 * | 11/2010 | Klapper et al. | .................. | 494/37 |

FOREIGN PATENT DOCUMENTS

DE 198 07 294 C2 9/1999
GB 2 294 191 A 4/1996

OTHER PUBLICATIONS

International Search Report dated Jun. 14, 2005.

* cited by examiner

*Primary Examiner* — Carolyn Paden
(74) *Attorney, Agent, or Firm* — Buchanan Ingersoll & Rooney PC

(57) ABSTRACT

The disclosure relates to a method of improving the efficiency of fat separation in the separation of a liquid food product with a certain fat content. The method includes the method step that the liquid food product is caused to pass through a first separator where the product is divided up into a lighter and a heavier phase. The first separator is regulated so that the lighter phase will have a fat content which is less than 15%. The method also includes the method step that the lighter phase is caused to pass through a second separator.

14 Claims, 1 Drawing Sheet

METHOD OF IMPROVING THE EFFICIENCY OF FAT SEPARATION IN THE SEPARATION OF A LIQUID FOOD PRODUCT

TECHNICAL FIELD

The present invention relates to a method of improving the efficiency of fat separation in the separation of a liquid food product with a certain fat content, comprising the step that the liquid food product is caused to pass through a first separator where the product is divided up into a lighter phase and a heavier phase.

BACKGROUND ART

Separation is an industrial process which is often employed in the food industry. Fat separation is, for example, employed for milk and whey. The separation usually takes place in a centrifugal separator.

In its interior, the separator has a number of conical disks disposed in a stack with a well-defined distance between the disks. The disks are provided with distribution holes which are vertically arranged. Through these holes, the milk or whey enters from the inlet in the actual separation section and is subjected to centrifugal force. Particles and impurities in the milk or whey move outwards along the surfaces of the disks and are accumulated in a sedimentation space. The lighter phase of the liquid food, i.e. the fat/cream moves inwards along the surfaces of the disks towards the axis of rotation and is conveyed out from the separator through an axial outlet. The heavier phase, which may consist of skim milk or whey which has been freed of fat globules moves outwards along the surfaces of the disks and is accumulated at an outlet. Modern separators may have different constructive concepts. The present invention may be employed for all types of centrifugal separators.

A common use for the separation process is separating milk, where the milk is separated into a skim milk phase and a cream phase. The milk may thereafter be standardised, for example into consumer milk at the desired fat content in that a part of the cream phase is recycled to the skim milk phase.

The separation process is also employed to extract fat from whey. Whey is a by-product in cheesemaking and, since roughly a third of the world's milk production is employed for cheesemaking, this implies that almost a third of all milk becomes whey. Whey which has previously only been used as animal feed and as fertiliser risked becoming an environmental problem. Today, whey has increasingly come to be considered as a valuable raw material for producing protein with a high nutrient content. The fat which is extracted from the whey is normally recycled back to cheesemaking or to other parts of the dairy process.

It is of interest to increase the fat separation in all separation processes, above all in whey separation. By separating more fat out of the whey, it is possible in a subsequent production of protein, to achieve a more efficient and more economical process.

Previous attempts to increase the yield in the light phase, i.e. to extract more fat from milk or whey, have entailed the employment of larger separators. Larger separators involve large capital costs, both as investment costs and as running costs.

OBJECTS OF THE INVENTION

One object of the present invention is to realise a method which, in a simple and reliable manner, increases the separation of fat from a liquid food product.

A further object of the present invention is that the method is more economical to install and run than prior art methods.

Still a further object of the present invention is that the increased separation of fat affords major advantages in subsequent processes, above all when the food product consists of whey.

SOLUTION

These and other objects have been attained according to the present invention in that the method of the type described by way of introduction has been given the characterising feature that the first separator is regulated so that the lighter phase has a fat content which is less than 15%, whereafter the lighter phase is caused to pass through a second separator.

Preferred embodiments of the present invention have further been given the characterising features as set forth in the appended subclaims.

BRIEF DESCRIPTION OF THE ACCOMPANYING DRAWING

One preferred embodiment of the present invention will now be described in greater detail hereinbelow, with reference to the accompanying Drawing. In the accompanying Drawing.

The accompanying Drawing shows only those details essential to an understanding of the present invention, the positioning of the separation process in a food plant, which is well-known to a person skilled in the art, having been omitted.

DESCRIPTION OF PREFERRED EMBODIMENT

Figure 1:
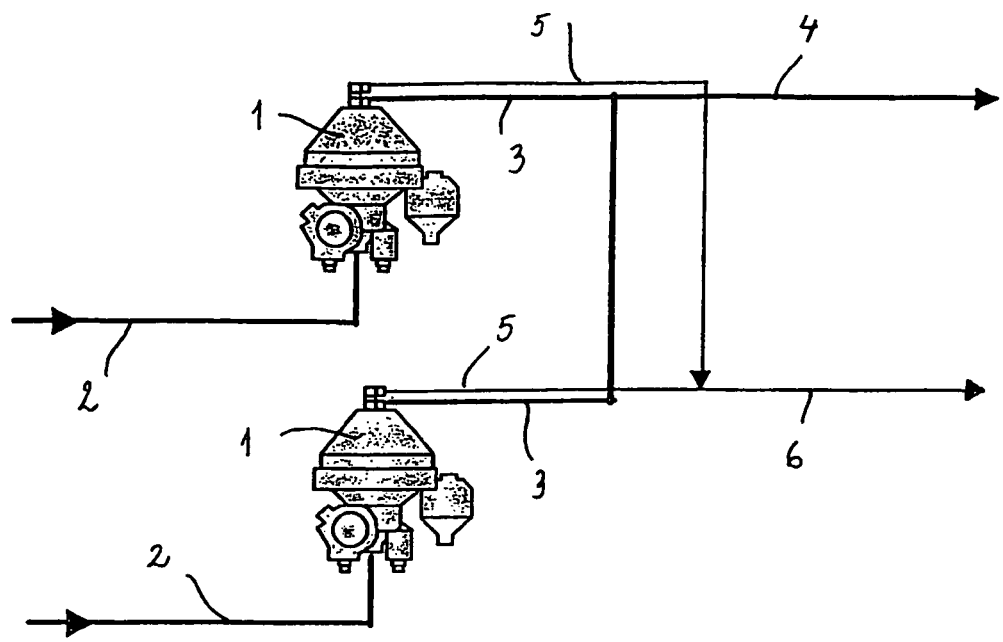
FIG. 1 is a flow diagram for state of the art separation.

FIG. 1 shows a flow diagram for separation for a liquid food according to the state of the art. The separation process includes at least one separator 1. The Drawing shows two separators 1 connected in parallel, but three or more separators 1 may also occur. The separator 1 is a centrifugal separator of the semi-open or hermetic type.

The food product may be raw milk having a fat content of 3.5-8.5%, or alternatively whey which normally has a fat content of 0.2-0.6%. The milk is usually separated at a temperature of 40-60° C., but lower temperatures may also occur. The whey is preferably at that temperature it has on leaving the cheesemaking tank, normally 30-50° C.

A conduit 2 leads the liquid food product into the separator 1. In the separator 1, the product is divided into a lighter and a heavier phase, at the same time as particles and impurities are removed from the product. The heavier phase, which consists of skim milk or alternatively fat-free whey, leaves the separator 1 through a conduit 3. The conduits 3 from two or more separators 1 are united to form a common conduit 4 for further processing of the heavier phase.

The lighter phase, which consists of cream or fat from the whey, leaves the separator 1 through a conduit 5. In the same manner, conduits 5 from several separators 1 are brought together into a common conduit 6 for further processing of the lighter phase.

In a conventional separation according to the state of the art, the above-described plant will give a heavier phase which normally has a residual fat content of 0.055-0.07%. The lighter phase has a fat content of 15-40% depending on product.

Figure 2:
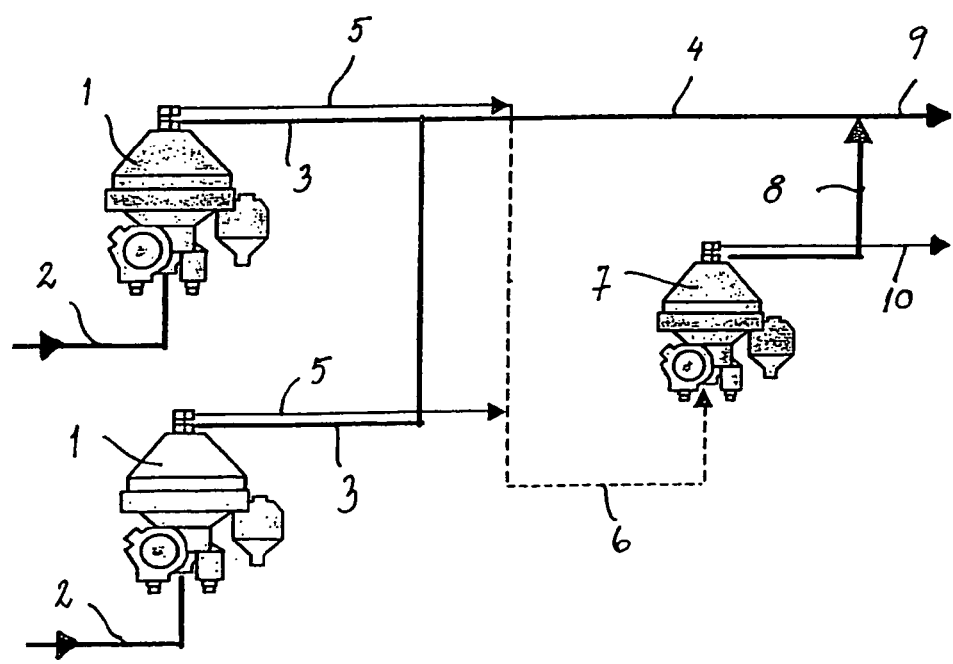
FIG. 2 is a flow diagram for separation according to the present invention.

FIG. 2 is a flow diagram for a separation process according to the present invention. The separation process includes at least a first separator 1. The Drawing shows two separators 1 connected in parallel, but three or more separators 1 may also occur. The first separator 1 is a centrifugal separator. The centrifugal separator 1 may consist of one of the constructions known on the market.

The food product may be raw milk having a fat content of 3.5-8.5%, or alternatively whey which normally has a fat content of 0.2-0.6%. The milk is usually separated at a temperature of 40-60° C., but lower temperatures may also occur. The whey is preferably at that temperature it has when it leaves the cheesemaking tank, normally 30-50° C.

A conduit 2 leads the liquid food product into the first separator 1. In the separator 1, the product is divided into a lighter and a heavier phase, at the same time as particles and impurities are removed from the product. The heavier phase, which consists of skim milk or alternatively fat-free whey, leaves the separator 1 through a conduit 3. The conduits 3 from two or more separators 1 are brought together to a common conduit 4 for further processing of the heavier phase.

The lighter phase, which consists of cream or fat from the whey, leaves the first separator 1 through a conduit 5. In the same manner, conduits 5 from several separators 1 are brought together into a common conduit 6.

The first separator 1 is regulated so that the lighter phase has a fat content of less than 15%. Preferably, the lighter phase has a fat content of 1-8%. This is attained by increasing the flow in the lighter phase, which entails that more small fat globules accompany the lighter phase which departs through the conduit 5.

If several first separators 1 are employed in the process, the lighter phase from all first separators is brought together in the conduit 6 and led in it to a second separator 7. The lighter phase is passed direct to the second separator 7, or alternatively by the intermediary of a balance tank (not shown). The second separator 7 is a centrifugal separator. The centrifugal separator 7 may consist of one of the constructions known on the market. In the second separator 7, the flow is once again divided into a lighter and a new heavier phase.

The new heavier phase leaves the second separator 7 through the conduit 8. The conduit 8 is united with the conduit 4 to form a common conduit 9 for skim milk or fat-free whey. As a result of the above described two-step separation, there will be obtained a skim milk or a fat-free whey which has a residual fat content of less than 0.05%.

The new, lighter phase leaves the second separator 7 via the conduit 10. Using the method according to the present invention, the lighter phase has a fat content of up to 40%.

Despite the apparently small quantities of increased fat separation, the method according to the present invention entails that the fat separation is increased by 5-10% for a normal food plant. In addition to obtaining an increased quantity of fat as yield, there will, above all as regards whey, be obtained a heavier phase which has a lower residual fat content than in conventional fat separation. This heavier phase constitutes a raw material for valuable protein extraction. In the protein extraction, it is a major advantage and involves major savings to obtain a reduced residual fat content. A lower residual fat content in the whey reduces both investment costs and running costs for a protein extraction plant.

The increased quantity of fat also has a commercial value. Either as an increased quantity of cream or as an increased quantity of fat from whey which is normally recycled back to cheesemaking.

As will have been apparent from the foregoing description, the present invention realises a method which, in a simple and economical manner, improves the efficiency of separation of a liquid food so that there will be obtained an increased separation of fat. The increased separation of fat affords major advantages in subsequent processes, above all when the food product consists of whey.

What is claimed is:

1. A method for improving the efficiency of fat separation in the separation of milk with a certain fat content, comprising:
passing the milk through a first separator where the milk is divided into a lighter phase which is cream and a heavier phase which is skim milk, the lighter phase of cream possessing a higher fat content than the heavier phase of skim milk;
the first separator being regulated so that the lighter phase of cream produced after passing the milk through the first separator has a fat content less than 15%; and
passing the lighter phase of cream divided out of the milk by the first separator and having the fat content less than 15% through a second separator different from the first separator to separate the lighter phase into a new lighter phase and a new heavier phase, wherein the new heavier phase possesses a lesser fat content than the new lighter phase.

2. The method as claimed in claim 1, wherein the first separator is regulated so that the lighter phase of cream has a fat content of 1-8%.

3. The method as claimed in claim 1, wherein the milk is whole milk with a fat content of 3.5-8.5% before being passed through the first separator.

4. The method as claimed in claim 1, wherein the new lighter phase of cream exiting the second separator has a fat content up to 40%.

5. The method as claimed in claim 1, wherein the lighter phase of cream exiting the first separator is delivered to the second separator without being mixed with the milk.

6. The method as claimed in claim 1, wherein the passing of the milk through the first separator comprises passing the milk through a first centrifugal separator, and the passing of the lighter phase of cream through the second separator comprises passing the lighter phase of cream through a second centrifugal separator.

7. The method as claimed in claim 1, wherein the new heavier phase has a residual fat content of less than 0.05%.

8. A method for improving the efficiency of fat separation in the separation of whey with a certain fat content, comprising:
passing the whey through a first separator where the whey is divided into a lighter phase which is fat and a heavier phase which is fat-free whey, the lighter phase of fat possessing a higher fat content than the heavier phase of fat-free whey;
the first separator being regulated so that the lighter phase of fat produced after passing the whey through the first separator has a fat content less than 15%; and
passing the lighter phase of fat divided out of the whey by the first separator and having the fat content less than 15% through a second separator different from the first separator to separate the lighter phase into a new lighter phase and a new heavier phase, wherein the new heavier phase possesses a lesser fat content than the new lighter phase.

9. The method as claimed in claim 8, wherein the first separator is regulated so that the lighter phase of fat has a fat content of 1-8%.

10. The method as claimed in claim 8, wherein the whey possesses a fat content of 0.2-0.6% before being passed through the first separator.

11. The method as claimed in claim 8, wherein the lighter phase exiting the second separator has a fat content up to 40%.

12. The method as claimed in claim 8, wherein the lighter phase of cream exiting the first separator is delivered to the second separator without being mixed with the milk.

13. The method as claimed in claim 8, wherein the passing of the milk through the first separator comprises passing the milk through a first centrifugal separator, and the passing of the lighter phase of cream through the second separator comprises passing the lighter phase of cream through a second centrifugal separator.

14. The method as claimed in claim 8, wherein the new heavier phase has a residual fat content of less than 0.05%.

\* \* \* \* \*